Patented Apr. 15, 1952

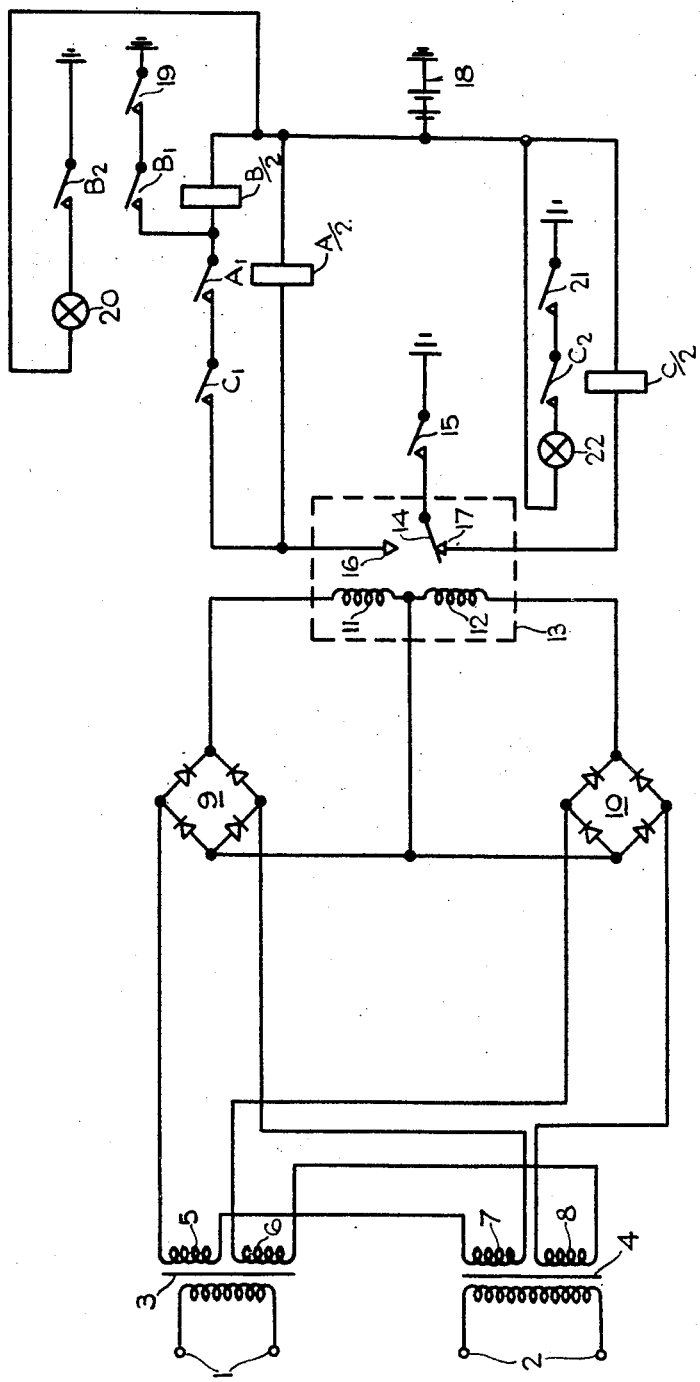

2,592,825

UNITED STATES PATENT OFFICE 2,592,825

FREQUENCY DIFFERENCE INDICATOR

Anatol Rutenberg, Shilton, near Coventry, England, assignor to The General Electric Company Limited, London, England Application September 3, 1949, Serial No. 114,038
In Great Britain September 3, 1948

8 Claims. (Cl. 177—311)

The present invention relates to electrical apparatus adapted to provide an indication in dependence upon a frequency difference between two electrical oscillations.

One use of such apparatus is in electrical signalling systems where it is desired to transmit a carrier signal at a predetermined frequency, either by line or by radio. Such apparatus is then used to compare the frequency of the carrier signal with a signal from a stabilized oscillator operating at the said predetermined frequency, and to give an indication of the frequency difference between the two signals and/or to give an indication when this difference attains a predetermined value. This latter indication may be in the form of an aural or visual alarm to draw the attention of operating personnel to the existence of the condition so that it may be rectified.

One object of the present invention is to provide novel and relatively simple apparatus adapted to provide an indication in dependence upon a frequency difference between two electrical oscillations.

According to the present invention apparatus adapted to provide an indication in dependence upon a frequency difference between two electrical oscillations comprises in combination frequency changing means adapted to provide two out-of-phase oscillations each having a frequency equal to said frequency difference, switching means to which each of said out-of-phase oscillations is applied so that said switching means is operated at a frequency proportional to said frequency difference and means operated by said switching means for providing an indication in dependence upon the value of said frequency difference.

The frequency changing means may comprise two pairs of input terminals to which said two electrical oscillations may be respectively applied, two non-linear mixing devices, and means for feeding a proportion of the oscillations from each pair of input terminals to each of the mixing devices in such a manner that the difference frequency oscillations obtainable from the output of each mixing device respectively are out of phase. The switching means may comprise a polarized electro-magnetic relay having two operating coils to which the two out-of-phase oscillations are respectively applied and having a moving contact which is switched between opposing contacts at a rate proportional to said frequency difference. The means for providing an indication may indicate if the frequency difference lies outside a predetermined range and may take the form of a visual or aural indicator which may be operated continuously or intermittently when the frequency difference lies outside the predetermined range.

One form of the means for providing an indication may comprise an arrangement of three relays in which a first relay is operated in one position of the switching means, a second relay is operated in another position of the switching means, while the third relay, which when operated is adapted to actuate the indicator, is only operated when the switching means is in the first-mentioned position and both the first and second relays are simultaneously operated, the arrangement being such that the release time of the first relay is longer than the operating time of the second relay and the release time of the second relay is shorter than the operating time of the first relay, so that an indication is given only when the period of one cycle of operation of the switching means is less than twice the release time of the first relay.

One arrangement in accordance with the present invention will now be described, by way of example with reference to the accompanying diagrammatic drawing, which shows a circuit diagram of one form of apparatus adapted to indicate a frequency difference between an electrical oscillation whose frequency it is desired to maintain at a given frequency within predetermined limits, and a reference oscillation of the given frequency generated by a stabilized oscillator.

Referring to the drawing, the two oscillations are applied to two pairs of input terminals 1 and 2 respectively and then to the primary windings of two transformers 3 and 4 respectively. The transformer 3 has two secondary windings 5 and 6, and the transformer 4 has two secondary windings 7 and 8. Winding 5 is connected in series with winding 7 and these two windings are connected across the input terminals of a full-wave rectifying circuit 9 which consists of four dry-plate metal rectifiers connected in the normal bridge arrangement. Winding 6 is connected in series with winding 8 but in the opposite sense as compared with windings 5 and 7, and windings 6 and 8 are connected across the input terminals of a second full-wave rectifying circuit 10 similar to the circuit 9. The output terminals of the circuits 9 and 10 are respectively connected across the operating coils 11 and 12 of a polarized electromagnetic relay which is shown within the dotted line 13.

The tongue 14 of the polarized relay is connected through an on and off switch 15 to ground, and is moved between fixed contacts 16 and 17 in dependence upon the energization of the operating coils 11 and 12. The contact 16 is connected to an electrical source 18 at a potential negative to ground, for example at minus twenty-four volts, through a relay A whose operating time is forty milliseconds and whose release time is five hundred milliseconds. Connected in parallel with relay A is relay B in series with contacts $A_1$ which are made on the operation of relay A and contacts $C_1$ which are made on the operation of a relay C. The relay B has an operating time of twenty milliseconds and operates contacts $B_1$ which are connected between the relay B and ground in series with a resetting switch 19, the arrangement serving to lock the relay B in operation when it is operated. The relay B also operates contacts $B_2$ which are connected in series with a lamp 20 between ground and the source 18. The relay C is connected between the contact 17 and the source 18 and has an operating time of ten milliseconds and a release time of twenty milliseconds. The relay C on operation makes a second pair of contacts $C_2$ which are connected in series with a switch contact 21 and a lamp 22 between ground and the source 18, as well as making the contacts $C_1$ referred to above. The polarized relay has a transit time of the order of one millisecond, a telegraph relay thus being suitable for this purpose.

The mode of operation of the circuit will now be described and for the purpose of explanation it will be initially assumed that the frequency of the oscillation to be monitored is slightly different from the given frequency, but is within the predetermined limits, which in the present case correspond to a frequency difference of one cycle per second between the oscillation to be monitored and the reference oscillation.

As described above, the series connections of the windings 5, 6, 7 and 8 are so arranged that the difference frequency oscillations produced across the output terminals of the circuits 9 and 10 respectively are out of phase with one another. Thus the tongue 14 of the polarized relay moves between the contacts 16 and 17, the tongue 14 moving to alternate contacts once every half cycle of the difference frequency. When the tongue is on contact 16, the relay A will be operated, within its characteristic operating time, but the relay B will not be operated since the contacts $C_1$ will not be made. When the tongue 14 moves to contact 17, the relay C will be operated, the relay A will remain operated for five hundred milliseconds, but the relay B will still not operate since its earth connection is broken by the movement of the tongue 14 to contact 17. Since, as is assumed above, the difference frequency is less than one cycle per second, the tongue 14 will not move back to contact 16 until after the relay A has released, and since the operating time of the relay A is greater than the release time of the relay C, the relay B will not be operated when the tongue 14 moves back on to contact 16.

However, if the frequency difference becomes greater than one cycle per second, the tongue 14 will move back to contact 16 before the relay A has released, and the relay B will be operated. The contacts $B_1$ will then be made, so that the relay B locks itself in operation. At the same time the contacts $B_2$ will be made to complete the operating circuit of the lamp 20, and a continuous alarm signal will be given until the switches 15 and 19 are broken. The switches 15 and 19 may be interconnected so as to be operated by a single action.

The lamp 22 may be observed to determine the difference frequency by timing its rate of operation, the lamp 22 being extinguished by means of the switch 21 if continual indication is not required.

It will be appreciated that the release time of the relay A determines the extent of deviation between the frequencies at which the alarm will be given, so that if it is required to vary the permissible deviation of the oscillation being monitored, the relay A is preferably adapted so that its release time is readily variable.

Although in the arrangement described one of the oscillations has been assumed to be stabilized in frquency, apparatus according to the present invention may equally well be used to indicate the deviation between two unstabilized oscillations, in order to maintain that deviation within predetermined limits without maintaining either oscillation within close frequency limits.

I claim:

1. Apparatus for providing an indication in dependence upon a frequency difference between two electrical oscillations, comprising two pairs of terminals to which two electrical oscillations may be respectively applied, means connected to the two pairs of terminals for deriving from said two electrical oscillations two oscillations which each have a frequency equal to said frequency difference and are out of phase with each other, switching means, means for applying the two out-of-phase oscillations to said switching means, said switching means being operable at a frequency proportional to said frequency difference in response to the application of the two out-of-phase oscillations to the switching means, and indicating means operable by the switching means in response to the frequency of operation of the switching means.

2. Apparatus for providing an indication in dependence upon a frequency difference between two electrical oscillations, comprising two pairs of terminals to which two electrical oscillations may be respectively applied, means connected to the two pairs of terminals for deriving from said two electrical oscillations two oscillations which each have a frequency equal to said frequency difference and are out of phase with each other, switching means, means for applying the two out-of-phase oscillations to said switching means, said switching means being operable at a frequency proportional to said frequency difference in response to the application of the two out-of-phase oscillations to the switching means, and indicating means operable by the switching means for giving an indication only when the frequency of operation of the switching means exceeds a predetermined value.

3. Apparatus according to claim 2, in which said switching means comprises a contact movable between two alternative positions in response to the application of the two out-of-phase oscillations to the switching means, and in which said indicating means comprises a first electromagnetic relay, an energizing circuit for said first relay which is completed by the contact when the contact is in one of the two positions, a second electromagnetic relay having an operating time shorter than the release time of the first relay and having a release time shorter than the operating time of the first relay, an energizing circuit for said second relay which is completed by the contact when the contact is in the other of the two positions, a third electromagnetic relay, an energizing circuit for said third relay which is completed only when the contact is in the first-mentioned position and the first and second relays are operated simultaneously, and an indicator operable by the third relay when the third relay is energized.

4. Apparatus according to claim 3, including means operable by the third relay for locking the third relay in operation when the third relay is energized.

5. Apparatus according to claim 2 in which said switching means comprises a contact movable between two alternative positions in response to the application of the two out-of-phase oscillations to the switching means, and in which said indicating means comprises a first electromagnetic relay, an energizing circuit for said first relay which is completed by the contact when the contact is in one of the two positions, a second electromagnetic relay having an operating time shorter than the release time of the first relay and having a release time shorter than the operating time of the first relay, an energizing circuit for said second relay which is completed by the contact when the contact is in the other of the two positions, a third electromagnetic relay, an energizing circuit for said third relay which is completed only when the contact is in the first-mentioned position and the first and second relays are operated simultaneously, an indicator operable by the third relay when the third relay is energized, and a second indicator operable by the second relay when the second relay is energized.

6. Apparatus for providing an indication in dependence upon a frequency difference between two electrical oscillations, comprising first and second transformers, each having two secondary windings, to the primary windings of which two electrical oscillations may be respectively applied, first and second non-linear mixing devices, means for applying two oscillations which are in phase with each other from the two secondary windings of the first transformer to the inputs of the first and second mixing devices respectively, means for applying two oscillations which are 180 degrees out of phase with each other from the two secondary windings of the second transformer to the inputs of the first and second mixing devices respectively, switching means, means for applying to said switching means two oscillations from the outputs of the first and second mixing devices respectively which each have a frequency equal to said frequency difference and are 180 degrees out of phase with each other, said switching means being operable at a frequency proportional to said frequency difference in response to the application of the two out-of-phase oscillations to the switching means, and indicating means operable by the switching means in response to the frequency of operation of the switching means.

7. Apparatus according to claim 6, in which said switching means comprises a polarized electromagnetic relay having two operating coils to which the two out-of-phase oscillations may be respectively applied and having a contact movable between two alternative positions at a rate proportional to said frequency difference in response to the application of the two out-of-phase oscillations to the operating coils.

8. Apparatus for providing an indication in dependence upon a frequency difference between two electrical oscillations, comprising first and second transformers, each having two secondary windings, to the primary windings of which two electrical oscillations may be respectively applied, first and second full-wave rectifying bridge circuits each consisting of four dry-plate metal rectifiers, means for applying two oscillations which are in phase with each other from the two secondary windings of the first transformer to the inputs of the first and second bridge circuits respectively, means for applying two oscillations which are 180 degrees out of phase with each other from the two secondary windings of the second transformer to the inputs of the first and second bridge circuits respectively, a polarized electromagnetic relay having two operating coils, means for respectively applying to the two operating coils two oscillations from the outputs of the first and second bridge circuits respectively which each have a frequency equal to said frequency difference and are 180 degrees out of phase with each other, said polarized relay having a contact movable between two alternative positions at a rate proportional to said frequency difference in response to the application of the two out-of-phase oscillations to the operating coils, a first electromagnetic relay, an energizing circuit for said first relay which is completed by the contact when the contact is in one of the two positions, a second electromagnetic relay having an operating time shorter than the release time of the first relay and having a release time shorter than the operating time of the first relay, an energizing circuit for said second relay which is completed by the contact when the contact is in the other of the two positions, a third electromagnetic relay, an energizing circuit for said third relay which is completed only when the contact is in the first-mentioned position and the first and second relays are operated simultaneously, an indicator operable by the third relay when the third relay is energized, means operable by the third relay for locking the third relay in operation when the third relay is energized, and a second indicator operable by the second relay when the second relay is energized.

ANATOL RUTENBERG.

REFERENCES CITED

The following references are of record in the file of this patent:

UNITED STATES PATENTS

| Number | Name | Date |
|---|---|---|
| 2,176,742 | La Pierre | Oct. 17, 1939 |
| 2,198,901 | Boswau | Apr. 30, 1940 |
| 2,232,896 | Wilson | Feb. 25, 1941 |
| 2,265,203 | Six | Dec. 9, 1941 |
| 2,309,280 | Stansbury | Jan. 26, 1943 |
| 2,454,687 | Baughman | Nov. 23, 1948 |